A. S. Adams,
Tree Protector
No. 109,098. Patented Nov. 8, 1870.
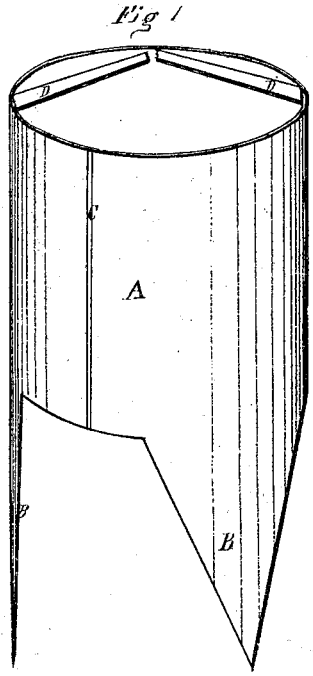
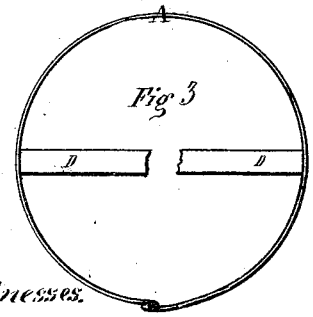
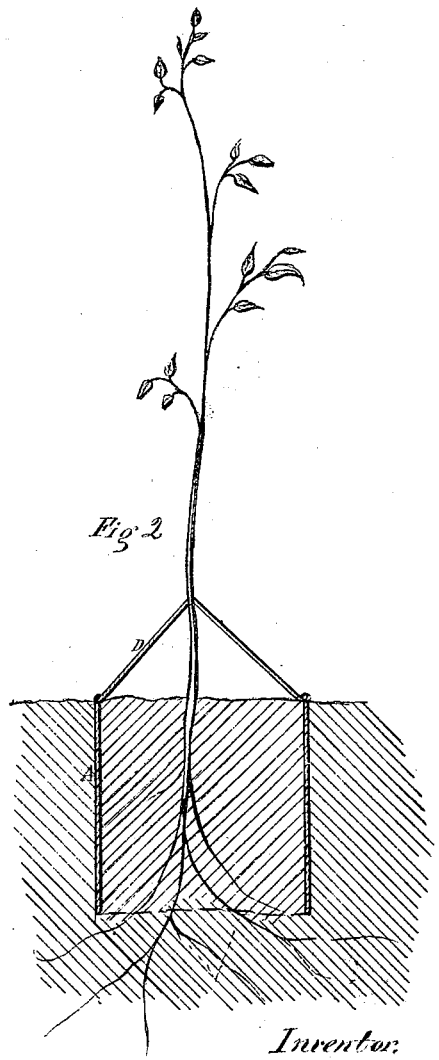
Witnesses:
Wm. H. Seaman
G. E. Breed
Inventor:
A. S. Adams
Daniel Breed Atty

United States Patent Office.

ABRAHAM S. ADAMS, OF WAYNESBOROUGH, PENNSYLVANIA.

Letters Patent No. 109,098, dated November 8, 1870.

IMPROVEMENT IN TREE-PROTECTORS.

The Schedule referred to in these Letters Patent and making part of the same.

*To all whom it may concern:*

Be it known that I, ABRAHAM S. ADAMS, of Waynesborough, in the county of Franklin and State of Pennsylvania, have invented a new and useful Improvement in Tree and Plant-Protectors; and I do hereby declare that the following is a full and exact description thereof, reference being had to the accompanying drawing and to the letters of reference marked thereon.

My invention consists in a hoop or hollow cylinder for the purpose of separating the different kinds of soil in setting or cultivating plants and trees.

In the accompanying drawing—

Figure 1 is a perspective view of my improved plant-protector.

Figure 2 is a section through the same when in position and ready for removal, the soil having been packed both upon the inside and the outside of the hoop.

Figure 3 is a top view, showing the hasp or joint by which the hoop is closed.

After long experiment, I have found that worms are prevented from injuring trees and plants, if poor hard earth or clay is packed around the tree or plant to a considerable depth from the surface. At the same time, by using rich mold below and outside of the protecting poor earth, the tree or plant will grow well.

In order conveniently to introduce this new plan of cultivation, I have invented a hoop or protector. My improved hoop may be made of sheet-metal, bent into a hollow cylinder, and hasped together by a joint, similar to a stove-pipe.

This hoop may have the form seen at A, fig. 1, with points B, which are to be inserted between the roots, and then the joint C closed.

Having set the plant or tree in place, and also set the hoop and closed the joint, clay or hard earth may be packed into the hoop around the stem, while rich mould is put around the outside of the hoop to the proper depth.

At the top of the hoop are two hinged arms or braces D, which serve to hold the stem erect while planting, as seen in fig. 2.

After the plant is fully set and the earth properly packed, the hoop may be raised out of the ground, the joint opened, and the hoop thus taken completely away.

By this plan, peach trees, and other trees and plants liable to be attacked by worms, are protected from such ravages.

Having described my invention,

I claim—

The above-described hoop for separating the poorer earth, near the stem, from the better mold, in setting or cultivating trees and plants, substantially as set forth.

ABRAHAM S. ADAMS.

Witnesses:
D. B. RUSSELL,
JEROME BEAVER.